United States Patent [19]

Habenicht et al.

[11] 4,368,372
[45] Jan. 11, 1983

[54] APPARATUS FOR RESISTANCE SEAM WELDING

[75] Inventors: Gerd Habenicht, Garching; Fritz Fischer, Neufahrn, both of Fed. Rep. of Germany

[73] Assignee: Fried. Krupp Gesellschaft mit beschränkter Haftung, Essen, Fed. Rep. of Germany

[21] Appl. No.: 149,538

[22] Filed: May 13, 1980

[30] Foreign Application Priority Data

May 14, 1979 [DE] Fed. Rep. of Germany ....... 2919365
Jan. 18, 1980 [DE] Fed. Rep. of Germany ....... 3001832

[51] Int. Cl.³ .............................................. B23K 11/06
[52] U.S. Cl. ...................................... 219/84; 219/120
[58] Field of Search .................. 219/81, 82, 83, 84, 219/119, 120

[56] References Cited

U.S. PATENT DOCUMENTS

| | | | |
|---|---|---|---|
| 1,176,614 | 3/1916 | Stanley | 219/119 |
| 1,300,603 | 4/1919 | Gravell | 219/81 |
| 1,806,949 | 5/1931 | Palm . | |
| 1,822,371 | 9/1931 | Pioch et al. | 219/81 |
| 1,943,771 | 1/1934 | Paugh | 219/84 |
| 2,918,564 | 12/1959 | Russell | 219/84 |
| 3,596,043 | 7/1971 | Sporri | 219/83 |
| 3,989,923 | 11/1976 | Lees et al. | 219/119 X |
| 4,100,391 | 7/1978 | Wilbur | 219/81 |
| 4,188,523 | 2/1980 | Kawai et al. | 219/84 X |

FOREIGN PATENT DOCUMENTS

| | | | |
|---|---|---|---|
| 1914424 | 11/1969 | Fed. Rep. of Germany . | |
| 1565803 | 4/1973 | Fed. Rep. of Germany . | |
| 370175 | 8/1963 | Switzerland . | |
| 326029 | 4/1972 | U.S.S.R. | 219/81 |

Primary Examiner—G. Z. Rubinson
Assistant Examiner—Keith E. George
Attorney, Agent, or Firm—Spencer & Kaye

[57] ABSTRACT

In an electrode for electrical resistance seam welding apparatus, which electrode is arranged to roll against a workpiece to be welded and is composed of a pressure member maintained out of contact with the workpiece, connected to a welding current supply, and made of a material which is a good electrical and thermal conductor, and a contact member in the form of an endless element mounted to roll against the workpiece and to be pressed against the workpiece by the pressure member, the contact member is composed of a rigid ring of a heat-resistant material selected to not form an alloy with the workpiece material, and the ring is mounted to surround the pressure member and to permit relative movement between the ring and the pressure member.

21 Claims, 8 Drawing Figures

FIG. 1
FIG. 2
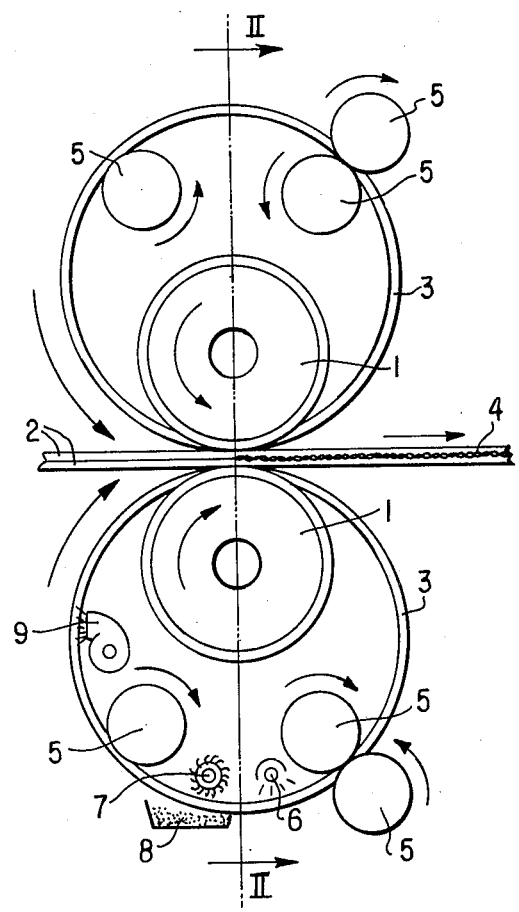
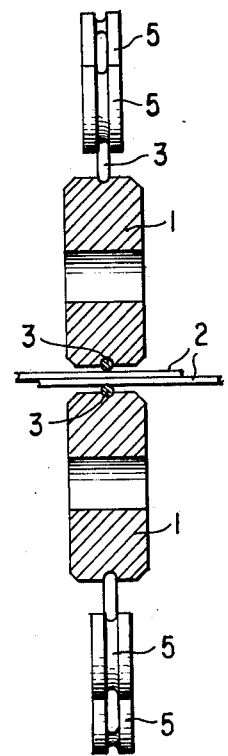

FIG. 3
FIG. 4
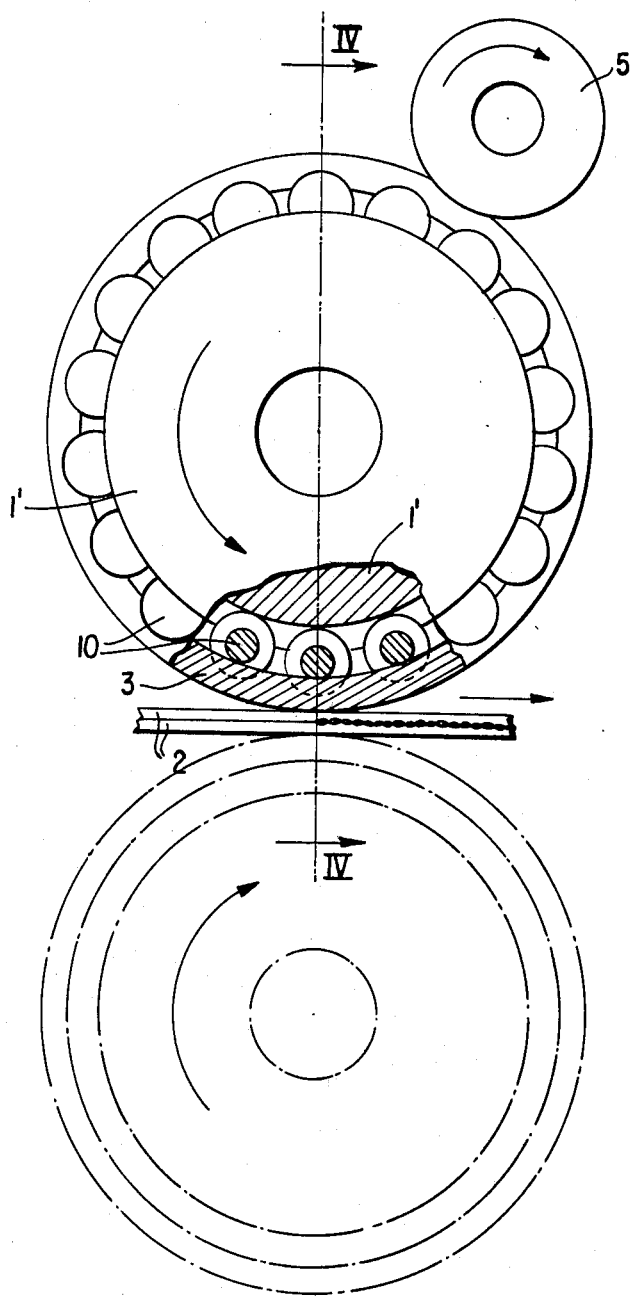
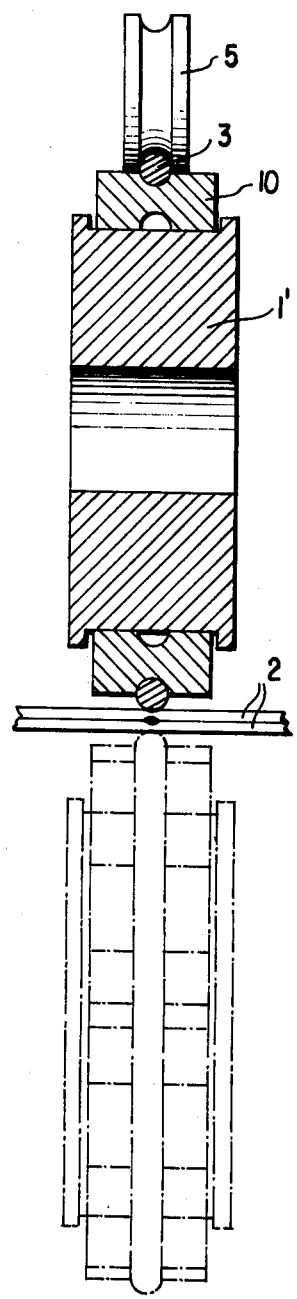

FIG. 5
FIG. 6
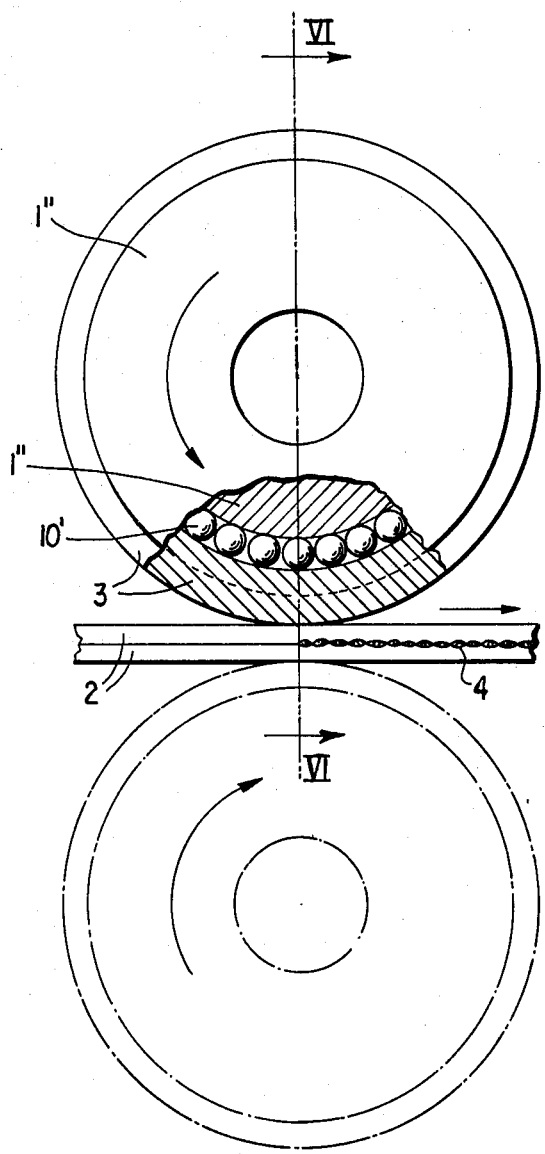
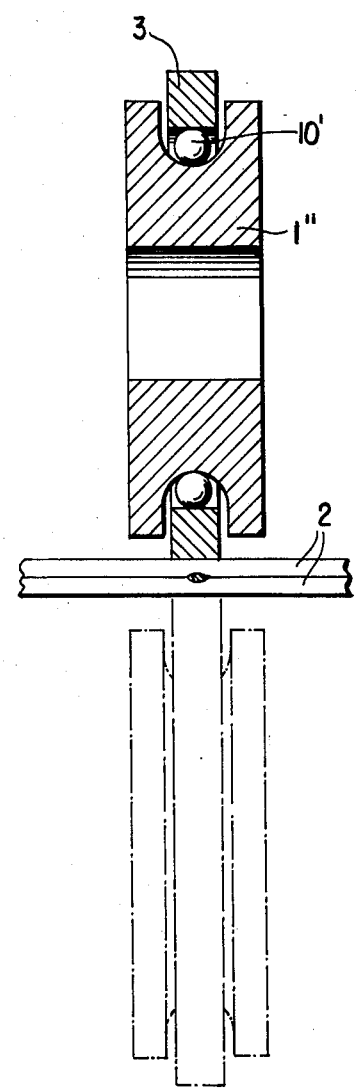

FIG. 7
FIG. 8
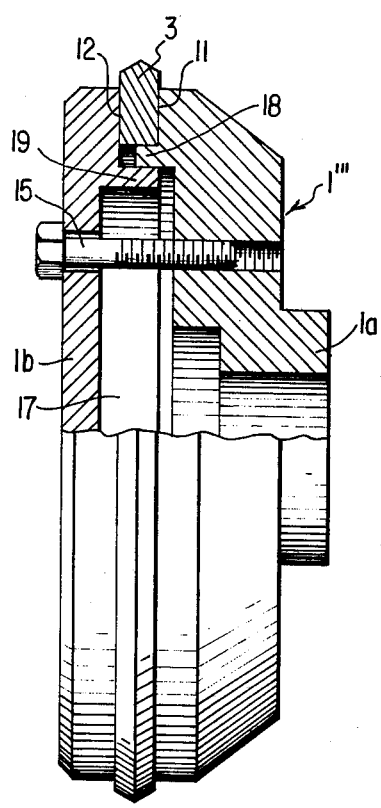
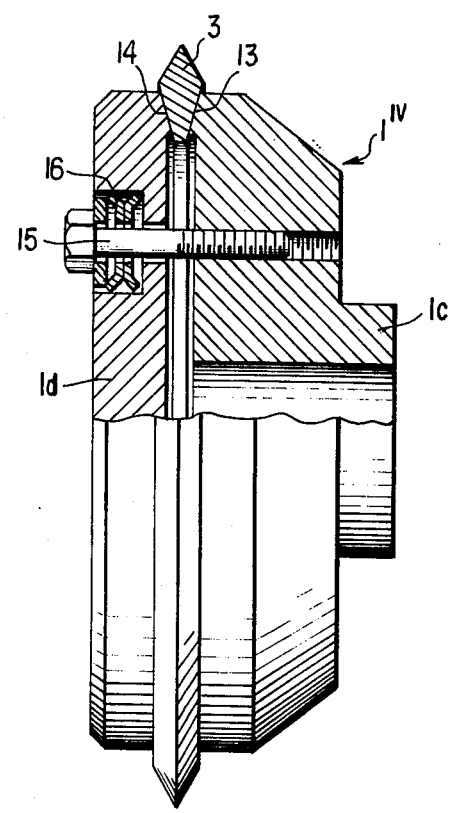

APPARATUS FOR RESISTANCE SEAM WELDING

BACKGROUND OF THE INVENTION

The present invention relates to an apparatus for performing electrical resistance seam welding, the apparatus being of the type including at least one electrode arrangement intended for rolling relative to pieces to be welded and provided with a pressure member which does not contact the pieces being welded and is connected to the welding current supply. This pressure member is made of a material having a high electrical conductivity and which is a good thermal conductor, e.g. copper. There also is provided a contact member in the form of an endless, rotating element which is intended to roll relative to the pieces being welded and which can be moved and pressed against the pieces being welded by the pressure member.

It is known that the resistance welding of certain materials, particularly iron sheets having metallic coatings of, for example, tin, zinc, lead, etc. presents considerable difficulties because the copper base electrodes usually employed form, under the influence of the welding temperatures and the contact pressure, alloys with the material of the coating of the pieces being welded and thus become contaminated. This alloy formation, which cannot be, or can only very slightly be, influenced in the course of the process, changes the welding parameters, particularly the material characteristics of the electrode material which influence the passage of current and heat, and thus interferes with the formation of the welds so that the formation of a uniform weld seam is no longer assured. The mechanical properties of the electrodes, such as hardness, heat resistance, geometric configuration, etc. may also be changed by the above-mentioned processes, likewise adversely influencing the welding parameters and the electrode lifetimes.

Swiss Pat. No. 370,175 describes an apparatus of the above-mentioned type in which the stated difficulties are to be avoided in that the contact member of the electrode is provided in the form of a wire, preferably a copper wire, which is placed around a pressure roller and is driven so that the welding location continuously receives fresh, i.e., not yet contaminated, wire and while the wire which has been contaminated by the welding process is removed. According to one embodiment of this prior art apparatus, the wire is guided in an endless loop around the pressure roller and a deflection roller and after leaving the welding location is passes through a cleaning device so that it can be used several times.

However, this has drawbacks in practice. The welding pressure and welding temperature impart considerable changes in cross section to the copper wire and, moreover, sufficient cleaning of the wire from the surface contamination caused by the alloy formation would be possible only by the removal of considerable amounts of material from the wire cross section. These influences that produce cross section changes would permit only a few revolutions of the endless wire loop while the welding parameters would change according to the changes in cross section. Even approximately sufficient liftimes cannot be realized with such an apparatus.

Another variation of the prior apparatus which has therefore found acceptance in practice is one in which the copper wire is unwound from a supply roll and, after passing through the welding location, it is would on a take-up reel to then be removed from the apparatus and melted, for example. As described in German Auslegeschrift [Published patent application] No. 1,565,803, it is also possible to pass the wire through the welding location twice, once at the upper side and once at the underside. This method is presently being widely used to provide rolled weld seams on sheet metals, having very thin metal coatings, particularly those used in the canning industry.

The drawback of this process, however, is that the copper wire is consumed material which must continuously be replenished and which is used up after one or two passes. For continuously welding larger quantities of material it is necessary to provide continuous replenishment of wire supply reels to the welding apparatus and to remove the take-up reels holding the used copper wire. Each change of reels requires an interruption in the operation so that, in the end, this prior art metod constitutes a discontinuous process. Since the wire, with respect to its weight, accepts less than 1% of the coating metal, e.g. tin, during the welding process, an unduly large quantity of copper wire must be made available.

Further drawbacks are that the relatively soft copper wire is deformed by the welding pressure so that during its second passage it no longer has the same cross section as in the first passage, and complicated and expensive mechanisms are required for guiding, routing, winding and unwinding the copper wire, for compensating changes in length occurring during welding and possibly also for reworking the cross section of the copper wire.

It is also known to use composite electrodes to spot weld metal coated sheets. These composite electrodes are formed of a major portion of copper and an insert or contact member of tungsten or some other metal or alloy which does not alloy, or alloys only poorly, with the coating material, e.g. as described in German Offenlegungsschrift [Laid-open application] No. 1,914,424, and which is intended to contact the material to be welded. In this way, electrode contamination due to alloy formation can be reduced considerably. However, considerable difficulties to arise due to the different coefficients of thermal expansion of the electrode materials which at the welding temperatures lead to considerable thermal stresses in the electrodes, to breaking, and loosening of the connection between pressing member and contact member and thus to a change in the current passage and heat dissipation characteristics which, in the end, result again in uncontrollable changes in the welding parameters and/or reduced electrode lifetimes.

These difficulties, which are already encountered in spot welding electrodes, are much greater for compound electrodes for welding rolled seams consisting, for example, of a copper roll and a circumferential coating of tungsten or the like, because for the latter electrodes a perfect connection with more uniform current and heat flow properties must be maintained over the entire circumference of the electrode and on the welding material subjected to the unrolling movement. Moreover, the required lifetimes here are substantially greater.

It has not yet been possible to find a satisfactory design for a compound electrode for welding rolled seams.

SUMMARY OF THE INVENTION

It is therefore an object of the present invention to improve an apparatus of the above-mentioned type in a manner to avoid constant consumption of electrode wire and achieve a long useful life for the apparatus without the occurrence of changes in the welding parameters due to electrode contamination or the like.

This and other objects are accomplished, according to the present invention, in an electrode for electrical resistance seam welding apparatus, which electrode is arranged to roll against a workpiece to be welded and is composed of a pressure member maintained out of contact with the workpiece, connected to a welding current supply, and made of a material which is a good electrical and thermal conductor, and a contact member in the form of an endless element mounted to roll against the workpiece and to be pressed against the workpiece by the pressure member, by constituting the contact member of a rigid ring of a material selected to not form an alloy with the workpiece material, and mounting the ring to surround the pressure member and to permit at least relative radial movement between the ring and the pressure member to allow for differences in thermal expansion between the contact member and the pressure member.

The relative movement referred to above further encompasses relative rotational movements occurring when the pressure member is disposed eccentrically to the ring or does not rotate.

With this arrangement, the contact member, because it is of a material which is inert to alloying with respect to the workpiece, remains practically free from alloying contamination and, due to its heat resistance, also free from changes in cross section as a result of the welding pressure and welding temperature and thus makes possible a long service life without changes in the welding parameters. The selection of such a material would be impossible in the prior art devices operating with flexible wire electrodes guided around guide rollers because of the continuously repeated bending deformations to which they are subjected during rotation. On the other hand, there exists the advantage, compared to compound electrodes, that in the electrode according to the present invention the pressure member and the contact member have no permanent mechanical connection with one another, i.e. relative movement can occur therebetween, and thus their respectively different thermal expansion cannot lead to loosening of such a connection so that there will be no uncontrollable changes in the current and heat passage properties and thus in the welding parameters.

According to a preferred embodiment of the invention, the ring-shaped contact member is arranged to be concentric with the pressure member and is rotatable thereon via rollers. These rollers also effect the transmission of electric current and heat to the contact member.

According to another preferred embodiment of the invention, the ring-shaped contact member has a larger diameter than the pressure member and undergoes a rotary movement eccentric thereto. This has the particular advantage that a considerable portion of the rotational path of the ring is spaced from the pressure member and can therefore be cooled there, for example, independently of the pressure member or can be cleaned of adhering residues. On its path of rotation spaced from the pressure member, the ring can be guided and supported by additional guide rollers.

The rotating ring can be driven by the pressure member and/or by one or a plurality of drive rollers which engage the ring.

A cooling device, e.g. in the form of a blower, and/or a cleaning device for cleaning the ring of adhering tin or the like can be disposed along the portion of the path of rotation which is spaced from the pressure member. The cleaning device may include, for example, brushes or scrapers possibly connected with a heating device for heating the material to be removed up to its melting temperature.

According to a further particularly simple and advantageous embodiment of the invention, the ring is clamped into the pressure member with a pressure force sufficient for the transfer of electric current and heat while providing a radial mobility to permit radial thermal expansion movements between the ring and the clamping faces of the pressure member.

In contradistinction to the previously mentioned embodiments, the contact pressure between the ring and the pressure member, as required for the transfer of current and heat is in the last mentioned embodiment not provided by the pressure against the workpiece but, completely independently thereof, by clamping the ring to the pressure member by application of a clamping force which acts essentially perpendicularly to the plane of the ring and thus to the direction of pressure exerted on the workpiece. By dimensioning the clamping force in such a manner that room exists for radial thermal expansion, it is assured that high thermal stresses cannot build up in the electrode and cracks in the electrode or loosening of the contact member cannot occur. Thus, there exist well defined current and heat transfer conditions between the ring and the pressure member of the electrode which are essentially independent of local heating.

The uniformity of the clamping and of the current and heat transfer can be further improved by additional measures, e.g. clamping in by clamping means which exert a clamping force that is independent of expansions in the material, such as for example, by means of expansion screws, spring elements or the like, and/or by arranging the clamping surfaces obliquely with respect to the axis, and/or by coating the clamping or contact faces, respectively, of the ring and/or the pressure member.

BRIEF DESCRIPTION OF THE DRAWINGS

FIG. 1 is a simplified side elevational view of an electrode arrangement according to a preferred embodiment of the invention.

FIG. 2 is a cross-sectional elevational view taken along the line II—II of FIG. 1.

FIG. 3 is a side elevational view, partly in cross section, of another embodiment of an electrode arrangement according to the invention.

FIG. 4 is a cross-sectional elevational view taken along the line IV—IV of FIG. 3.

FIG. 5 is a view similar to that of FIG. 3 of another embodiment of an electrode arrangement according to the invention.

FIG. 6 is an elevational cross-sectional view taken along the line VI—VI of FIG. 5.

FIGS. 7 and 8 are a front elevational view, partially in section, of two further embodiments of roll electrodes according to the invention.

DESCRIPTION OF THE PREFERRED EMBODIMENTS

The embodiment shown in FIGS. 1 and 2 is composed of two driven, cooled copper electrode rollers 1 which are rotatably driven in a conventional manner (which is therefore not shown) and are connected to a welding current supply. Two metal sheets 2 to be welded together pass between these two electrodes. The electrode rollers 1, however, do not directly contact the metal sheets 2. Instead, each roller serves to press a ring 3 of tungsten, molybdenum or a similar alloying-inert and heat resistant material against the sheets 2, each ring 3 being brought between an associated electrode roller 1 and the sheets 2 to be welded. The rings 3 of tungsten, molybdenum or the like may be manufactured in any desired manner, for example, by sintering, forging, casting, cutting, turning or the like.

The electrode rollers 1 must thus be considered to be the pressure members and also the current supply members of the apparatus and the rings 3 which contact the material 2 to be welded must be considered to be the contact members of the apparatus. The rings 3 have a larger diameter than the electrode rollers 1 and thus contact the latter only in the area of the welding location where current is transferred between the electrode rollers 1, through the contact members 3 and the sheets 2 to be welded so that a weld seam 4 is formed.

On the remaining portion of their circumferential paths, the annular contact members 3 are spaced from their associated pressure rollers 1 and can there be supported and guided by means of additional supporting and guide rollers 5 which, like the electrode roller 1 serving as the pressure members, are provided with circumferential grooves to guide the annular contact members 3. One or a plurality of the supporting and guide rollers may also be drive rollers and may be driven in synchronism to drive the pressure members 1 and to advance the sheets 2 to be welded.

Along the circumferential path of the lower contact member 3 in FIG. 1, there is further disposed a cleaning station provided with a heating element 6, a wire brush 7 and a collector 8, as well as a cooling station including a blower 9. Corresponding device may of course also be provided for the upper contact member 3.

Depending on the material employed and its intended purpose, the contact member 3 may have different cross-sectional configurations, e.g. circular, square, wedge-shaped, as is advisable to attain an optimum weld seam, the highest possible contact pressure and/or the best possible guidance on the pressure member 1 or on the guide rollers 5.

In the embodiment shown in FIGS. 3 and 4, each electrode is composed of a roller-shaped pressure member 1' which, however, in contradistinction to the previous embodiment, need not be rotatably mounted. Each pressure member 1' is preferably made of copper, is connected to a welding current supply terminal and can be subjected to a pressing force directed toward the sheets 2 to be welded. A ring 3 of tungsten, molybdenum or the like is mounted on each member 1' via a ring of rollers 10 to be rotatable in the manner of a roller bearing so that it can perform a circumferential movement around the associated pressure member 1'. Welding pressure and welding current are conducted by the pressure members 1' through the rollers 10 to the rings 3 serving as the contact members and through the sheets 2 to be welded. The lower electrode of FIG. 3 has the same design as the upper electrode and is not shown in detail for that reason. An externally contacting drive roller 5 may serve to drive each ring 3 in synchronism with the sheets 2 to be welded.

The embodiment of FIGS. 5 and 6 differs from that of FIGS. 3 and 4 in that the annular contact members 3 are mounted via balls 10' in a peripheral groove of each pressure member 1''. Additionally, a separate drive roller for the contact members 3 can be eliminated so that members 3 are driven by being entrained by the sheets 2 to be welded. Otherwise the structure and operation are the same as in the preceding embodiment.

The roller electrode embodiment shown in FIG. 7 includes a pressure member 1''' in the form of a copper roller which is divided into two halves 1a and 1b that are detachably clamped together by means of machine screws 15. The two parts 1a and 1b delimit a groove at the circumference members 1''' into which the alloying-inert contact member 3, e.g. of tungsten, molybdenum or an alloy thereof, is inserted so that it is clamped between the clamping faces 11, 12 of the two electrodes halves 1a and 1b by means of the screws 15. The clamping force exerted by means of screws 15 is selected in such a manner that perfect transfer of current and heat is assured at the clamping faces 11, 12, but that, on the other hand, relative radial movement between the contact member 3 and the pressure member 1''' due to differences in thermal expansion can occur in an essentially unimpeded manner. The screws 15 are preferably expansion screws so that they generate a clamping force that is essentially independent of the heating of the pressure member 1'''.

The space between the two halves 1a and 1b of the pressure member 1''' may include a cavity 17 for the circulation of a coolant. An additional seal against radial escape of coolant can be created by the provision of axially overlapping annular flanges 18 and 19 on the two halves 1a and 1b. The devices for supplying the coolant are not shown, nor are the connections of the pressure member 1''', for example, with a drive shaft which permits the exertion of an advancing force, via the roller electrode, on the material to be welded.

The roller electrode shown in FIG. 8 differs from that of FIG. 7 mainly in that the clamping faces 13 and 14 with which electrode halves 1c and 1d are clamped against the contact member 3 are inclined with respect to the axis of the electrode, i.e. are conical surfaces. Correspondingly, the associated contact faces of the contact member 3 are also conically inclined. At its outside, the contact member 3 has a blade shape to correspond to the desired width of the weld seam to be produced similarly to the embodiment of FIG. 7.

In the embodiment of FIG. 8, the two electrode halves 1c and 1d are clamped against one another by means of screws 15 through the intermediary of one or more plate springs 16. These plate springs are able to absorb axial thermal expansion as well as axial changes in the distance between the two parts 1c and 1d of the pressure member which occur as a result of the presence of oblique clamping faces 13, 14 and can maintain a clamping force which is essentially constant.

The clamping faces 11 and 12 of FIG. 7 or 13 and 14 of FIG. 8, and/or the contact faces of contact member 3 contacting these faces may be provided with a suitable coating, e.g. silver, in order to enhance current and heat transfer and/or reduce friction during temperature related relative movement.

The embodiments of FIGS. 7 and 8 may also be modified in such a manner that the contact member is arranged eccentrically, rather than concentrically, with the pressure member, in a manner similar to the embodiment of FIG. 1 and will then also be able to perform a sort of tumbling movement with respect to the pressure member. Instead of screws and springs, other clamping means known to the person skilled in the art may also be used to clamp in the contact member.

Instead of the illustrated circular, rectangular or blade-shaped cross sections of the contact member, the cross section may also be band-shaped or elliptical. Various drive means are also conceivable. The pressure member may be driven so as to transfer its movement to the contact member. Or, vice versa, the contact member may be driven to then carry along the pressure member. Finally, it is possible to exert an advancing drive only on the material to be welded so that the movement of contact member and pressure member is produced exclusively by friction contact with that material. Particularly good welding results should be attainable if the material to be welded as well as the electrode system are driven in synchronism.

An apparatus according to the present invention makes it possible to operate with much higher contact pressures compared to copper wire electrodes, thus attaining a good resistance weld seam formation and avoiding thickening of material in the region of the seam while attaining a penetration depth for the electrodes as required for the desired current concentration. Due to the good heat resistance of tungsten or comparable materials, there will occur practically no change in cross section and/or lengthening of the contact member. Moreover, due to the provision of an alloying-inert contact member there will be no, or only insignificant, removal of coating material, such as, for example, tin, from the welding location so that weakening of the corrosion protection in the region of the seam is avoided.

It will be understood that the above description of the present invention is susceptible to various modifications, changes and adaptations, and the same are intended to be comprehended within the meaning and range of equivalents of the appended claims.

What is claimed is:

1. An electrode for electrical resistance seam welding apparatus, which electrode is arranged to be in welding engagement with a workpiece to be welded, said electrode comprising: a pressure member maintained out of contact with the workpiece, connected to a welding current supply, and made of a material which is a good electrical and thermal conductor; a contact member in the form of an endless element surrounding said pressure member and mounted to roll against the workpiece and to be pressed against the workpiece by said pressure member to be in welding engagement with the workpiece, said contact member being constituted by a rigid ring of a heat-resistant material selected to not form an alloy with the workpiece material, and being mounted to surround said pressure member; and means mounting said contact member to said pressure member for permitting relative radial movement therebetween caused by differences in thermal expansion between said contact and pressure members, wherein said means mounting said contact member include clamping faces presented by said pressure member and between which said ring is clamped in said pressure member in a manner to have radial mobility sufficient to allow for thermal expansions while assuring efficient electric current and heat transfer between said ring and said pressure member.

2. An electrode as defined in claim 1 wherein said pressure member is made of copper.

3. An electrode as defined in claim 1 wherein said ring has a larger diameter than said pressure member and is mounted to rotate about an axis eccentric to that of said pressure member.

4. An electrode as defined in claim 3 further comprising at least one of a cooling device and a cleaning device disposed at a location along said ring spaced from said pressure member so as to act on said ring.

5. An electrode as defined in claim 1 wherein said pressure member is mounted to rotate and to impart rotary movement to said ring.

6. An electrode as defined in claim 1 further comprising a drive roller arranged to be rotated and disposed in driving engagement with said ring for rotating said ring at a speed such that the peripheral speed of said ring is equal to the speed of advance of the workpiece.

7. An electrode as defined in claim 1 wherein said pressure member is provided with a peripheral guide groove which conforms to the cross section of said ring and in which said ring engages.

8. An electrode as defined in claim 1 wherein said ring has a circular cross section.

9. An electrode as defined in claim 1 wherein said ring has a polygonal cross section.

10. An electrode as defined in claim 1 wherein the portion of said ring directed toward the workpiece has a cross section which tapers in the direction toward the workpiece.

11. An electrode as defined in claim 1 wherein the clamping faces of said pressure member and the surfaces of said ring contacting said clamping faces are inclined relative to a plane perpendicular to the axis of rotation of said ring.

12. An electrode as defined in claim 1 wherein said pressure member comprises two parts each presenting one of said clamping faces, and clamping means secured, and providing a clamping force, between said parts.

13. An electrode as defined in claim 12 wherein said clamping means comprise screws and cooperating spring elements.

14. An electrode as defined in claim 12 wherein said clamping means comprise expansion screws.

15. An electrode as defined in claim 12 wherein said parts are formed to define a cavity between themselves for circulation of a coolant.

16. An electrode as defined in claim 15 further comprising sealing means disposed to form a seal between said cavity and the region of said clamping faces.

17. An electrode as defined in claim 1 further comprising a friction reducing coating secured to said clamping faces on the surfaces of said ring contacting said clamping faces.

18. An electrode as defined in claim 1 further comprising a current and heat transfer improving coating secured to said clamping faces or the surfaces of said ring contacting said clamping faces.

19. An electrode as defined in claim 17 or 18 wherein said coating is of silver.

20. An electrode as defined in claim 1 wherein said ring is made of a material selected from among tungsten, molybdenum, a tungsten alloy and a molybdenum alloy.

21. An electrode as defined in claim 1 wherein said contact member and said pressure member are made of respectively different materials having respectively different coefficients of thermal expansion.

* * * * *